United States Patent
Ven

(10) Patent No.: US 8,511,298 B2
(45) Date of Patent: Aug. 20, 2013

(54) REFLECTIVE SOLAR ENERGY COLLECTION SYSTEM

(76) Inventor: Juha Ven, Beijing (CN)

( * ) Notice: Subject to any disclaimer, the term of this patent is extended or adjusted under 35 U.S.C. 154(b) by 856 days.

(21) Appl. No.: 12/672,121

(22) PCT Filed: Jul. 4, 2008

(86) PCT No.: PCT/CN2008/001274
§ 371 (c)(1),
(2), (4) Date: Feb. 4, 2010

(87) PCT Pub. No.: WO2009/024011
PCT Pub. Date: Feb. 26, 2009

(65) Prior Publication Data
US 2011/0220092 A1    Sep. 15, 2011

(30) Foreign Application Priority Data
Aug. 17, 2007 (CN) .......................... 2007 1 0143301

(51) Int. Cl.
*F24J 2/18*  (2006.01)
*G02B 7/182*  (2006.01)

(52) U.S. Cl.
USPC ........... 126/685; 126/684; 359/850; 359/855; 359/856

(58) Field of Classification Search
CPC .................................. F24J 2/1047; F24J 2/18
USPC ................. 126/685; 359/850, 851, 852, 853, 359/855, 856, 869
See application file for complete search history.

(56) References Cited

U.S. PATENT DOCUMENTS

| | | | | | |
|---|---|---|---|---|---|
| 503,004 | A | * | 8/1893 | Severy | 359/849 |
| 1,880,938 | A | * | 10/1932 | Emmet | 126/657 |
| 4,078,549 | A | * | 3/1978 | McKeen et al. | 126/606 |
| 4,149,521 | A | * | 4/1979 | Fletcher et al. | 126/693 |
| 4,158,356 | A | * | 6/1979 | Wininger | 126/579 |
| 4,249,516 | A | * | 2/1981 | Stark | 126/601 |
| 4,290,418 | A | * | 9/1981 | Uroshevich | 126/657 |
| 4,304,221 | A | * | 12/1981 | Trihey | 126/581 |
| 4,324,225 | A | * | 4/1982 | Trihey | 126/581 |
| 4,355,630 | A | * | 10/1982 | Fattor | 126/576 |
| 4,432,345 | A | * | 2/1984 | McIntire | 126/694 |
| 4,784,700 | A | * | 11/1988 | Stern et al. | 136/248 |
| 5,154,163 | A | * | 10/1992 | Rabl | 126/690 |
| 5,288,337 | A | * | 2/1994 | Mitchell | 136/246 |
| 5,365,920 | A | * | 11/1994 | Lechner | 126/696 |
| 5,431,866 | A | * | 7/1995 | DeMasters et al. | 264/40.1 |
| 5,465,708 | A | * | 11/1995 | Goebel et al. | 126/635 |
| 5,542,409 | A | * | 8/1996 | Sampayo | 126/606 |
| 5,655,515 | A | * | 8/1997 | Myles et al. | 126/601 |
| 6,080,927 | A | * | 6/2000 | Johnson | 136/248 |
| 6,244,264 | B1 | * | 6/2001 | Winston | 126/652 |
| 8,134,104 | B2 | * | 3/2012 | Finot et al. | 250/203.1 |
| 2004/0163640 | A1 | * | 8/2004 | Kuckelkorn | 126/694 |

(Continued)

*Primary Examiner* — Steven B McAllister
*Assistant Examiner* — J. Crockett Hailey, III
(74) *Attorney, Agent, or Firm* — SV Patent Service

(57) ABSTRACT

The present application provides a primary reflector in a solar collection system. The primary reflector includes a first reflective section that can reflect solar rays onto a first focal line, a second reflective section on the left side of the first reflective section, and a third reflective section on the right side of the first reflective section. The second reflective section can reflect solar rays to the right side of the first focal line. The third reflective section can reflect solar rays to the left side of the first focal line.

12 Claims, 17 Drawing Sheets

(56) References Cited

U.S. PATENT DOCUMENTS

| | | | |
|---|---|---|---|
| 2007/0107769 A1* | 5/2007 | Cobb et al. | 136/246 |
| 2010/0043779 A1* | 2/2010 | Ingram | 126/694 |
| 2010/0091396 A1* | 4/2010 | Hutson et al. | 359/859 |
| 2010/0319774 A1* | 12/2010 | Schwartz | 136/259 |
| 2011/0100419 A1* | 5/2011 | Maeda | 136/246 |
| 2011/0232633 A1* | 9/2011 | Lima | 126/628 |

* cited by examiner

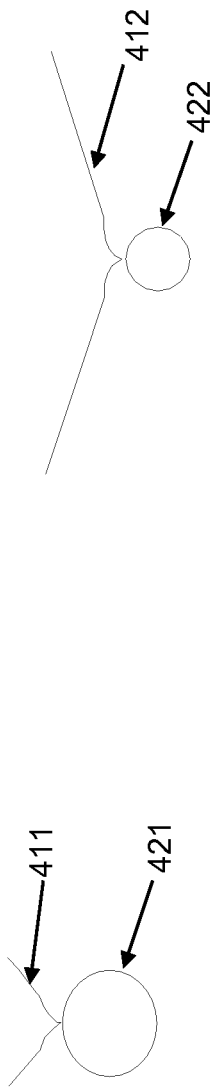
Figure 4A
Figure 4B
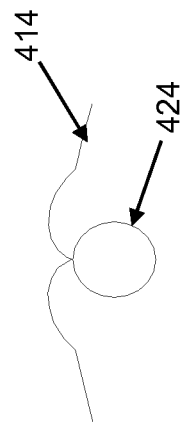
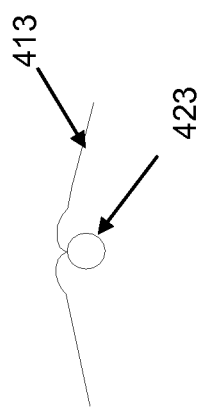
Figure 4C
Figure 4D

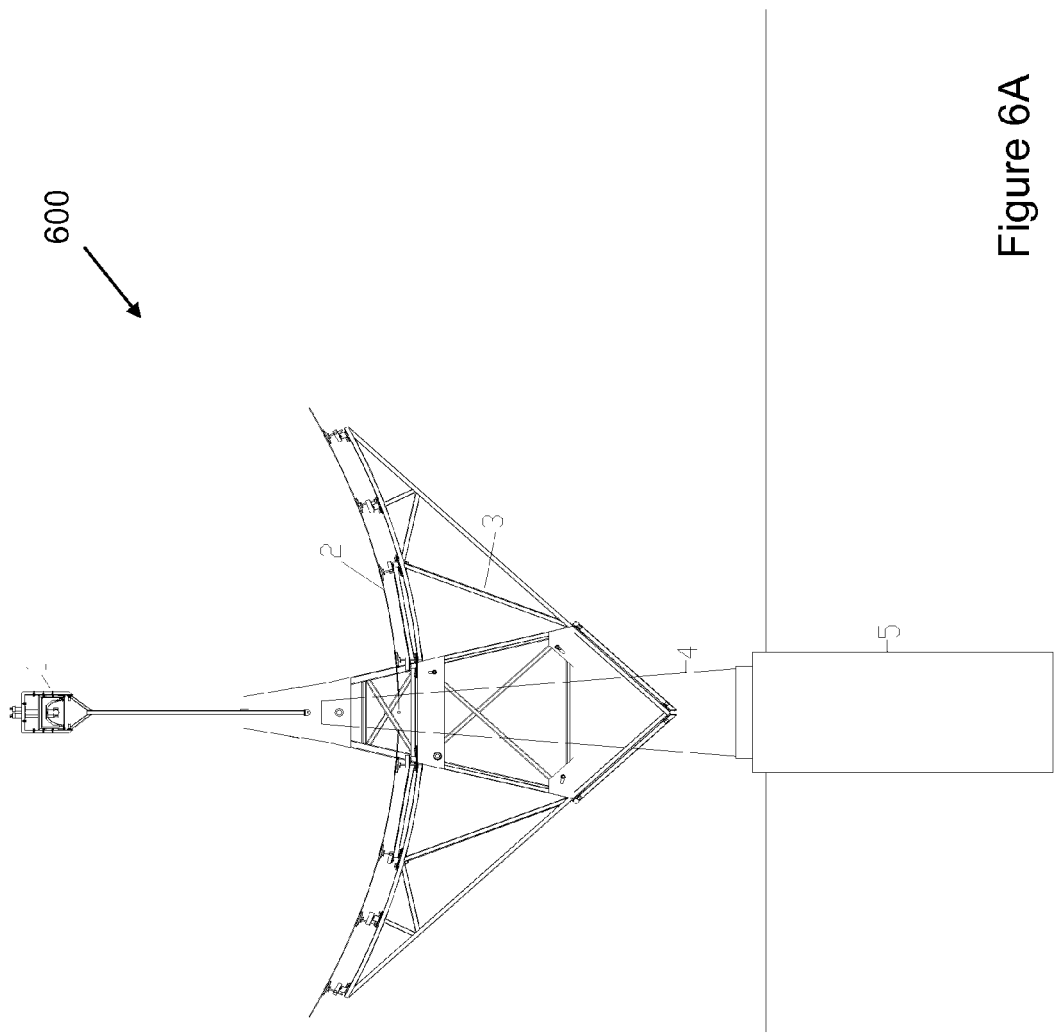

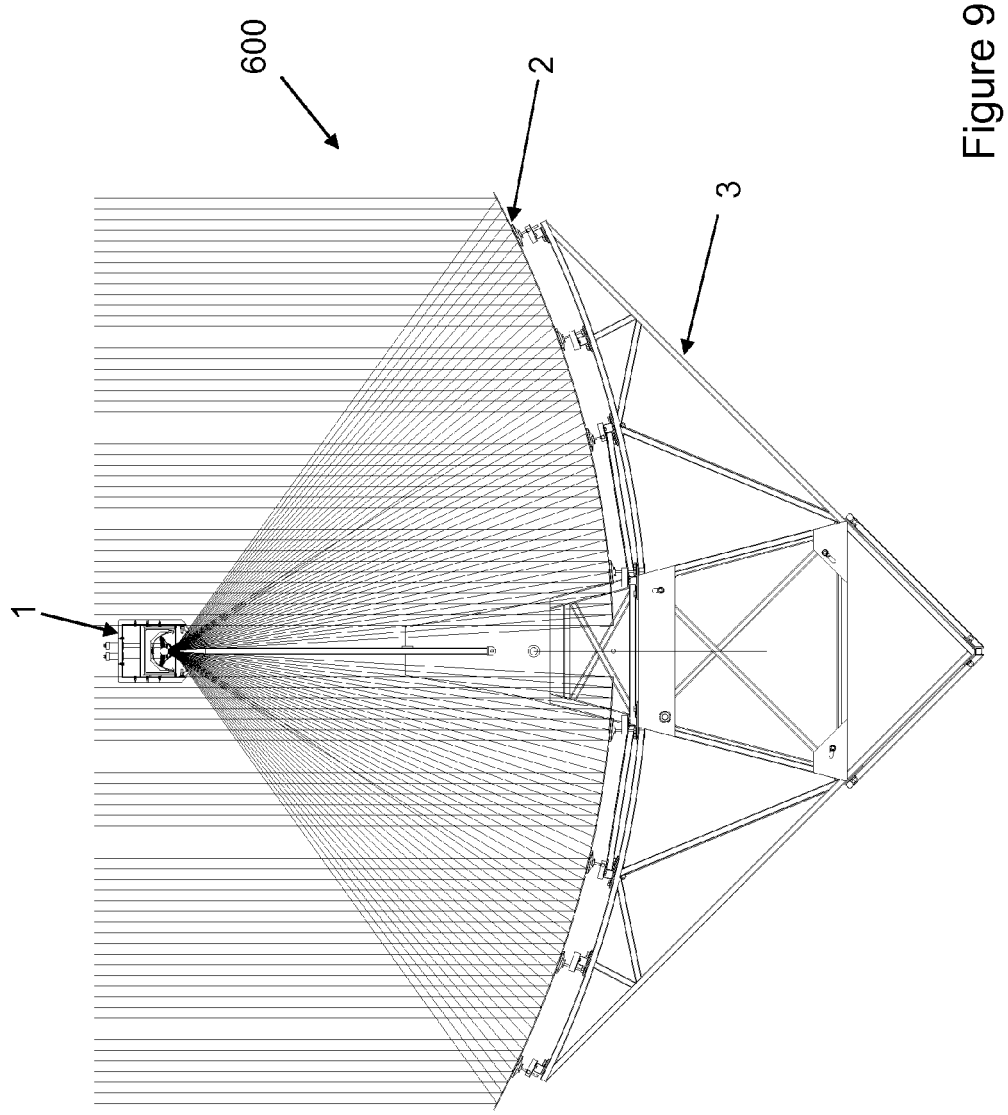

REFLECTIVE SOLAR ENERGY COLLECTION SYSTEM

CROSS-REFERENCE TO RELATED APPLICATIONS

The present application is a national-entry application based on and claims priority to PCT Patent Application PCT/CN2008/001274, entitled "A reflector and a solar tank-type heat collector applying it" by the same inventors, filed Jul. 4, 2008, which claims priority to Chinese Patent Application No. 200710143301.X, filed Aug. 17, 2007. The content of these applications is incorporated herein by reference.

BACKGROUND

The present disclosure relates to solar technology, especially to reflective solar collector technologies.

A trough-type solar energy collector typically includes a linear reflector, which often has a linear parabolic shape. The linear reflector can commonly rotate around its center of gravity to follow the path of the sun, reflecting the solar radiation onto a heat receiver. Although a heat receiver may have several shapes, but out of mechanical considerations, a heat receiver is most often in the form of a cylindrical tube that contains a fluid circulating inside to transfers heat collected by the heat receiver to an application area. In most cases, the cylindrical receiver tube is made of steel and has a spectral selective coating on its surface, The coating allows the linear receiver to absorb most of the solar radiation while significantly reducing thermal radiation loss.

Heat losses can be further reduced by enclosing the receiver tube by one or several glass envelops. The space between the receiver tube and the glass envelop can be sealed by vacuum, as in some commercially produced heat collecting elements (HCE), to further reduce heat loss. However, it is difficult to keep a vacuum bellow 13 Pa for a long period of time at temperatures of up to 400 degree C. Many failures with vacuum loss are due to hydrogen permeation as reported by NREL (the Parabolic Trough Workshop, Mar. 9, 2007, Golden, Colorado).

In trough-type solar energy collectors, increasing the operating temperature the receiver tubes can increase thermal cycle efficiency. Above a certain temperature, efficiency losses due to thermal radiation from the receiver tubes will increase more rapidly than the gains in thermal cycle efficiency. On the other hand, thermal radiation losses can be reduced by increasing concentration ratio. Current technology often uses a primary reflector comprising several reflective facets to focus maximum amount of solar radiation onto the receiver tube.

The parabolic reflector is often truncated due to economic and practical reasons, which decreases concentration ratio. The solar radiation reflected by the reflector cannot reach the side of the heat receiver facing the sun (and away from the reflector), which produces non-uniform heating of the receiver tube and can cause the receiver tube to bow and the glass envelop to break.

To increase the concentration ratio, several designs add a secondary reflector near the receiver tube. The receiver tube can be reduced in size. The solar radiation from the primary reflector that normally would have missed the receiver tube can now be reflected by the secondary reflector onto the non illuminated part of the receiver tube. The secondary reflector works like a light trap guiding spilled solar radiation to the non illuminated part of the receiver tube. Secondary reflectors can double the concentration ratio and allow higher optical tolerances.

FIGS. 1-5 show several trough collectors having secondary reflectors. FIG. 1 shows a trough-type solar collection system 100 (e.g. Duke Solar) comprising a primary parabolic reflector 110, a receiver tube 120, and a secondary reflector 130 positioned inside a vacuum envelop 140. There is no gap between the secondary reflector 130 and the receiver tube 120. The primary parabolic reflector 110 has a large curvature radius and low rim angle.

FIGS. 2 and 3 show trough-type solar collection systems 200 and 300 (reported by J. M. Gordon 1991 Solar energy, Volume 47, No. 6, pp 457-466). The trough-type solar collection system 200 has a primary reflector 210 having a high rim parabolic trough, an receiver tube 220, and a complex-shaped secondary reflector 230 positioned inside a glass tube 240. The trough-type solar collection system 300 has a primary reflector 310 having a parabolic trough, and a secondary reflector 320 comprising a compound parabolic collector (CPC) 322 and a flat receiver 323. The primary reflector 310 has a bigger curvature radius and a low rim angle.

FIGS. 4A-4D show various shapes of secondary reflectors 411-414 and their associated heat receivers 421-424 in parabolic trough collectors (reported by Harald Ries in Applied Optics, Volume 35, No, 13, May 1, 1996).

FIG. 5 shows a trough-type solar collection system 500 (reported by J. M. Gordon, 1993) that includes an ice-cream-cone-shaped CPC 510 and a cylindrical heat receiver 520 in a glass envelop 530 with a gap between the CPC 510 and the receiver tube 520. Gap losses are compensated by increased reflection area. This type of CPC is widely used in domestic hot water systems incorporating Dewar vacuum tubes.

Ideally, the top of secondary reflector should be in contact with the receiver tube to close the light trap. This is however problematic because the secondary reflector, often made of glass, cannot sustain the high thermal shocks when it touches the extremely hot receiver tube. Furthermore, non-uniform heating, as described above, causes the receiver tubes expand and bow, which makes it more difficult to keep the receiver tube apart from the secondary reflector. Leaving a space between the secondary reflector and the heat receiver produces an opening in the light trap and leads to losses in solar radiation.

Another problem associated with secondary reflectors is that solar rays are reflected several times before they strike the surface secondary reflector and then reaching the receiver tube. The increase number of reflections causes optical losses. For the above reasons, most trough-type solar collectors comprising secondary concentrators have lower efficiencies than trough collectors without secondary concentrators, which has prevented secondary reflectors in commercial trough collectors.

SUMMARY

The present invention is aimed to provide a solar collector comprising a novel reflector that can more evenly distribute the solar radiation around the receiver tube.

This new invention is also aimed to provide a solar collector having a higher concentration factor and increased intercept factor. The new invention can prevent solar radiation losses related to gaps between the secondary reflector and heat receiver, and multiple reflections on the secondary reflector.

The disclosed primary reflector includes a first reflective section, a second reflective section on the left side of the first section, and a third reflective section on the right side of the first section. The first section can reflect the solar rays to a first focal line or a quasi focal line. The second section can reflect the solar rays to the right side of the first focal line or the quasi focal line. The third section can reflect the solar rays to the left side of the first focal line or the quasi focal line.

The second section can reflect the solar rays onto a second focal line or a quasi focal line on the right side of the first focal line. The third section can reflect the solar rays to a third focal line or a quasi focal line on the left side of the first focal line. The first reflective section can include a left portion and a right portion. The left portion can be connected with the second section. The right portion can be connected to the third section. The left and right portions can be symmetric.

The disclosed trough collector can include a primary reflector, a secondary reflector, and a receiver tube. The primary reflector includes a first reflective section, a second reflective section on the left side of the first section, and a third reflective section on the right side of the first section. The first reflective section can reflect solar rays to the receiver tube. The second reflective section can reflect solar rays to the right part of secondary receiver and then onto the receiver tube. The third reflective section can reflect solar rays to the left part of secondary receiver and then onto the receiver tube.

The secondary reflector can have an "ice cream cone" type CPC. The first section of the primary reflector can reflect solar rays to a first focal line or quasi focal line, which is located at the center of the receiver tube. The second section can reflect solar rays to a second focal line or the quasi focal line on the right side of the first focal line. The third section can reflect solar rays to a third focal line or quasi focal line on the left side of the first focal line. The solar rays reflected by the second or the third section of the primary reflector to the secondary reflector are located in the middle of zone formed by edge rays.

The second section in the primary reflector can include one or more of the following zones:
  Zone 1: the solar rays reflected by this zone to the secondary reflector are in the middle of edge ray region. One of the edge rays strikes the receiver tube tangentially. Another edge ray strikes the receiver tube tangentially after being reflected by the edge portion on the right side of the secondary reflector.
  Zone 2: the solar rays reflected by this zone to the secondary reflector are in the middle of edge ray region. One of the edge rays strikes the receiver tube tangentially. Another edge ray strikes the receiver tube tangentially after being reflected by the edge portion on the right side of the secondary reflector.
  Zone 3: the solar rays reflected by this zone to the secondary reflector are in the middle of edge ray region. One of the edge rays strikes the receiver tube tangentially. Another edge ray strikes the receiver tube after being reflected by the edge portion on the right side of the secondary reflector.
  Zone 4: the solar rays reflected by this zone to the secondary reflector are in the middle of edge ray region. One of the edge rays strikes the receiver tube by the edge portion on the left side of the secondary reflector. Another edge ray strikes the receiver tube after being reflected by the edge portion on the right side of the secondary reflector.

The third section in the primary reflector can include one or more of the following zones:
  Zone 1: the solar rays reflected by this zone to the secondary reflector are in the middle of edge ray region. One of the edge rays strikes the receiver tube tangentially. Another edge ray strikes the receiver tube tangentially after being reflected by the edge portion on the left side of the secondary reflector.
  Zone 2: the solar rays reflected by this zone to the secondary reflector are in the middle of edge ray region. One of the edge rays strikes the receiver tube tangentially. Another edge ray strikes the receiver tube tangentially after being reflected by the edge portion on the left side of the secondary reflector.
  Zone 3: the solar rays reflected by this zone to the secondary reflector are in the middle of edge ray region. One of the edge rays strikes the receiver tube tangentially. Another edge ray strikes the receiver tube after being reflected by the edge portion on the left side of the secondary reflector.
  Zone 4: the solar rays reflected by this zone to the secondary reflector are in the middle of edge ray region. One of the edge rays strikes the receiver tube by the edge portion on the right side of the secondary reflector. Another edge ray strikes the receiver tube after being reflected by the edge portion on the left side of the secondary reflector.

The disclosed primary reflector can include a low iron glass coated with silver. The receiver tube can include a cylindrical steel tube with a spectral selective coating. The disclosed receiver can include one layer or several layers of glass envelops. The space inside the glass envelop can be evacuated to bellow 100 Pa. The disclosed secondary reflector can be not in contact with the receiver tube, while keeping a distance in between. The first section of the primary reflector can have a left portion and a right portion separated by a distance that is equal to the projection width of the secondary receiver on the primary reflector. The secondary reflector can have a surface coating for reducing low thermal emission, an insulating layer on the backside (i.e. non-reflective side), and a steel sheet wrapped by an insulation layer. The opening of the secondary reflector cavity that faces the primary reflector can be closed by a glass or polymer (e.g. TEFLON™) sheet coated with an anti-reflective film. The primary reflector of the trough collector can have a rotating axis, around which the collector can track the sun automatically. The disclosed trough collector can have a rotation axis which is not coplanar to the primary reflector's surface. The receiver tube or the glass envelops can be supported by guiding wheels.

In contrast to conventional technologies, the disclosed trough-type solar collection systems can uniformly distribute solar radiation around the receiver tube and thus significantly reduce thermal stress and bowing of the receiver tube.

The disclosed trough-type solar collection systems can provide a higher concentration factor and relaxes tolerance for optical precision, thus providing more robust energy-collection performance. The CPC compatible with the disclosed primary reflector can have a large gap between the top of the CPC and the receiver tube, which simplifies manufacturing and increases reliability of the disclosed trough-type solar collection systems.

The disclosed secondary reflector has much lower thermal loss than conventional trough-type solar collection systems without using expensive vacuum technologies. The back of the disclosed secondary reflector is properly insulated. The opening of the secondary cavity facing the primary reflector is closed. These features enable the disclosed systems to have higher operating temperatures and thus higher overall efficiencies in comparison to conventional systems. Moreover, the system costs can be reduced and the reliability greatly improved greatly by eliminating expensive high vacuum technologies.

Furthermore, the disclosed solar energy collection system can avoid damages to the secondary reflector that occur in some conventional systems when the secondary reflector is broken by thermal shock from being in contact with the hot receiver tube.

Additionally, the disclosed solar energy collection system allows easy installation and alignment of the secondary reflector and the receiver tube, and relative to the primary reflector.

In one aspect, the present invention provides a primary reflector in a solar collection system. The primary reflector includes a first reflective section that can reflect solar rays onto a first focal line; a second reflective section on the left side of the first reflective section, wherein the second reflective section can reflect solar rays to the right side of the first focal line; and a third reflective section on the right side of the first reflective section, wherein the third reflective section can reflect solar rays to the left side of the first focal line.

Implementations of the system may include one or more of the following. The second reflective section can reflect solar rays onto a second focal line on the right side of the first focal line, wherein the third reflective section can reflect solar rays to a third focal line on the left side of the first focal line. The first reflective section can define a first reflective surface that is substantially the shape of a parabola. The second reflective section and the third reflective section can define reflective surfaces that are more concave than the parabola defined by the first reflective section. The first reflective section, the second reflective section, and the third reflective section can define reflective surfaces that have substantially a left-right symmetry.

In another aspect, the present invention provides a solar collection system, comprising: a receiver; a primary reflector comprising a first reflective section, a second reflective section on the left side of the first reflective section, and a third reflective section on the right side of the first reflective section, wherein the first reflective section of the primary reflector can reflect solar rays onto the receiver, wherein the second reflective section of the primary reflector can reflect solar rays to the right side of the receiver, wherein the third reflective section can reflect solar rays to the left side of secondary receiver; and a secondary reflector that can reflect the solar rays reflected by the second reflective section and the third reflective section of the primary reflector to the receiver.

Implementations of the system may include one or more of the following. The first reflective section can reflect solar rays onto a first focal line. The receiver can have the shape of a tube, wherein the first focal line is positioned at or near the axis of the tube. The second reflective section can reflect solar rays onto a second focal line on the right side of the receiver, wherein the third reflective section can reflect solar rays to a third focal line on the left side of the receiver. The receiver can be supported by guiding wheels. The receiver can include a steel tube having a spectral selective coating. The receiver can include one or more layers glass envelop around the steel tube. The secondary reflector is not in contact with the receiver. The solar rays reflected by the second reflective section to the secondary reflector can be in the middle of a zone formed by edge rays parallel to the solar rays. The edge rays can be defined by the solar rays that either pass by an edge of the secondary reflector or tangentially strike the receiver directly or after a reflection. The edge rays can include a first edge ray and a second edge ray, wherein the zone can include one of the following zone types:

zone 1: the first edge ray strikes the receiver tube tangentially and the second edge ray strikes the receiver tangentially after being reflected by the edge portion on the right side of the secondary reflector;

zone 2: the first edge ray strikes the receiver tube tangentially and the second edge ray strikes the receiver tangentially after being reflected by the edge portion on the right side of the secondary reflector;

zone 3: the first edge ray strikes the receiver tube tangentially and the second edge ray strikes the receiver after being reflected by the edge portion on the right side of the secondary reflector; and zone 4: the first edge ray strikes the receiver by the edge portion on the left side of the secondary reflector and the second edge ray strikes the receiver tube after being reflected by the edge portion on the right side of the secondary reflector.

The primary reflector can include a glass material coated with a layer of silver. The first reflective section of the primary reflector can include a left part and a right part that are separated by a distance equal to the orthographic projection width of the receiver on the primary reflector. The secondary reflector can define a cavity, wherein an opening of the cavity facing the primary reflector is sealed by a sheet to reduce heat loss. The sheet can include a glass material or a polymeric material (e.g. TEFLON™). The solar collection system can further include a mechanism configured to rotate the primary reflector about a rotating axis, wherein the rotating axis is not coplanar to the primary reflector.

BRIEF DESCRIPTION OF THE DRAWINGS

The following drawings, which are incorporated in and form a part of the specification, illustrate embodiments of the present invention and, together with the description, serve to explain the principles of the invention.

FIGS. 4A-4D show secondary reflectors of various shapes in some conventional solar collection systems.

FIGS. 6A-6B are respectively a side and a back views of a solar energy collection system in accordance with the present invention.

FIG. 9 is a side view showing the reflection paths of the sun rays in the solar energy collection system shown in FIGS. 6A-8.

DETAILED DESCRIPTION

Figure 2:
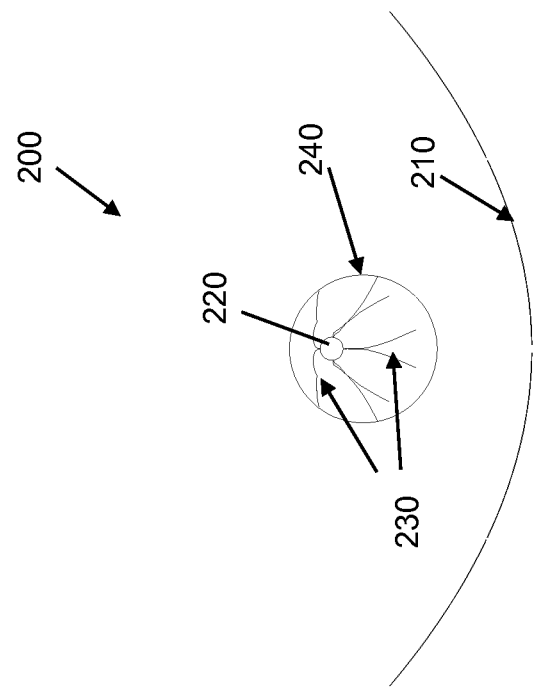
FIG. 2 is a schematic drawing of a high rim parabolic reflector and a solar secondary reflector in another conventional solar collection system.
Figure 1:
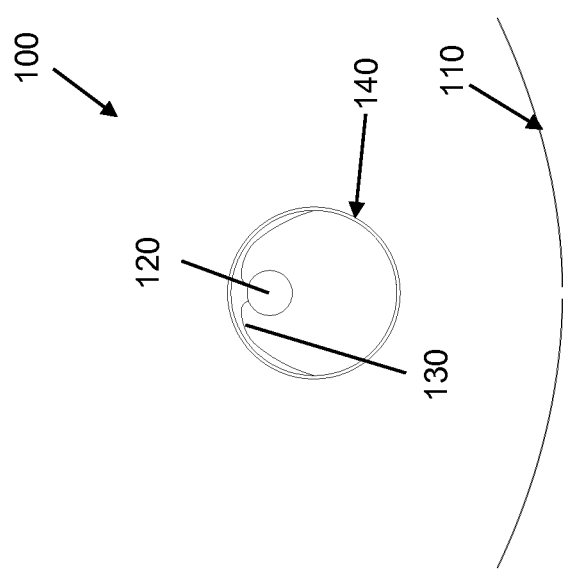
FIG. 1 is a schematic drawing of a solar secondary reflector in a vacuum envelop in a conventional solar collection system.
Figure 5:
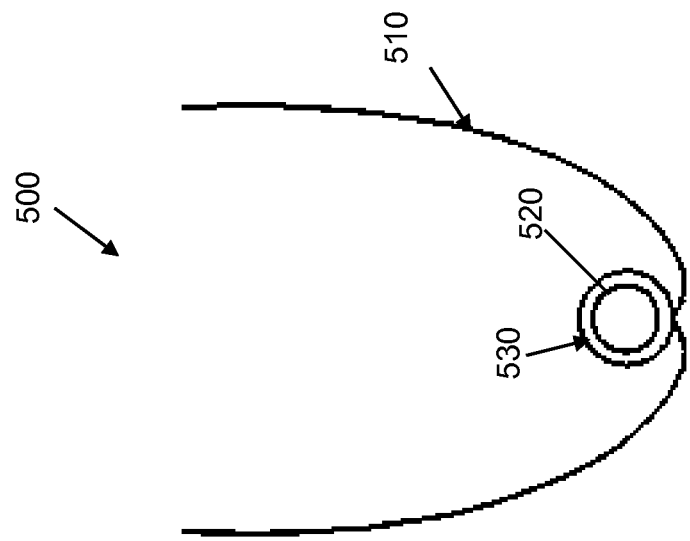
FIG. 5 shows an "ice cream cone" shaped CPC in another conventional solar collection system.
Figure 3:
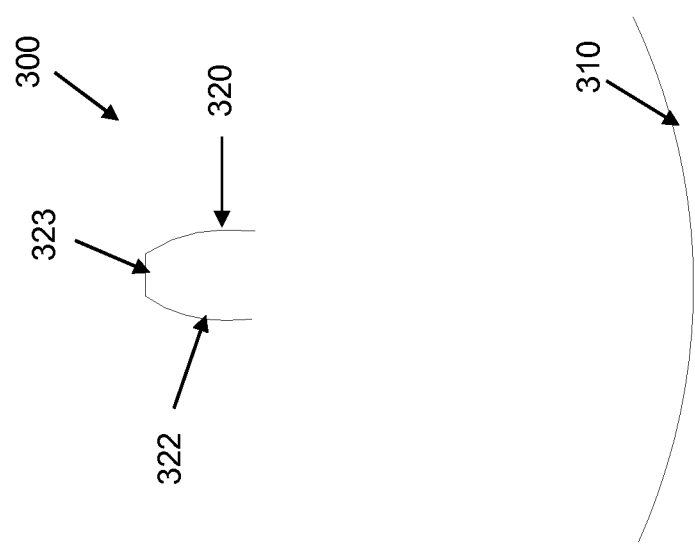
FIG. 3 show a parabolic trough with CPC secondary reflector and a flat receiver in another conventional solar collection system.
Figure 6B:
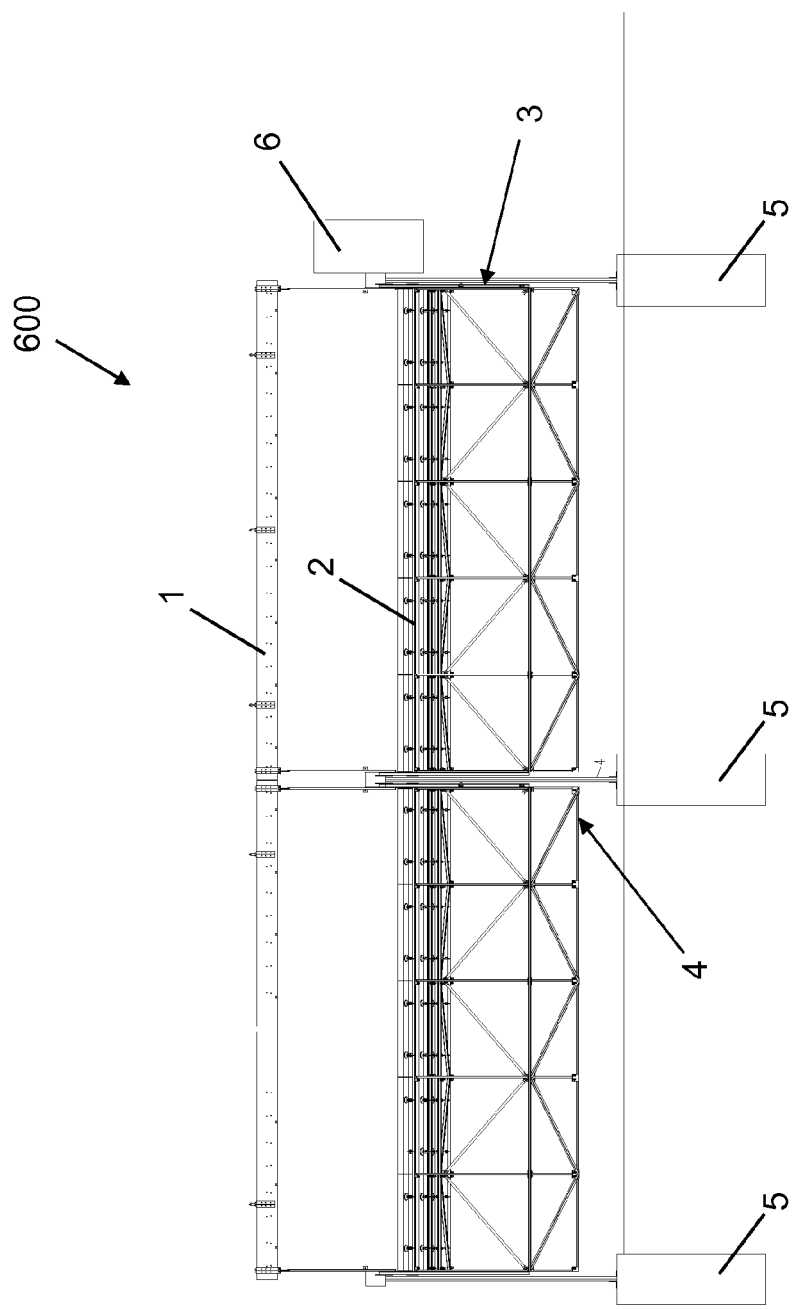

Referring to FIGS. 6A-8, a solar collection system 600 includes a compound parabolic collector 1 comprising a secondary reflector 101 and a steel receiver tube 102, a primary reflector 2 that is formed by a low iron glass sheet coated by silver, a steel structure 3 for supporting the primary reflector 2, steel support pillars 4, steel reinforced concrete foundations 5 for supporting the steel structure 3, and a torque box 6.

Figure 7:
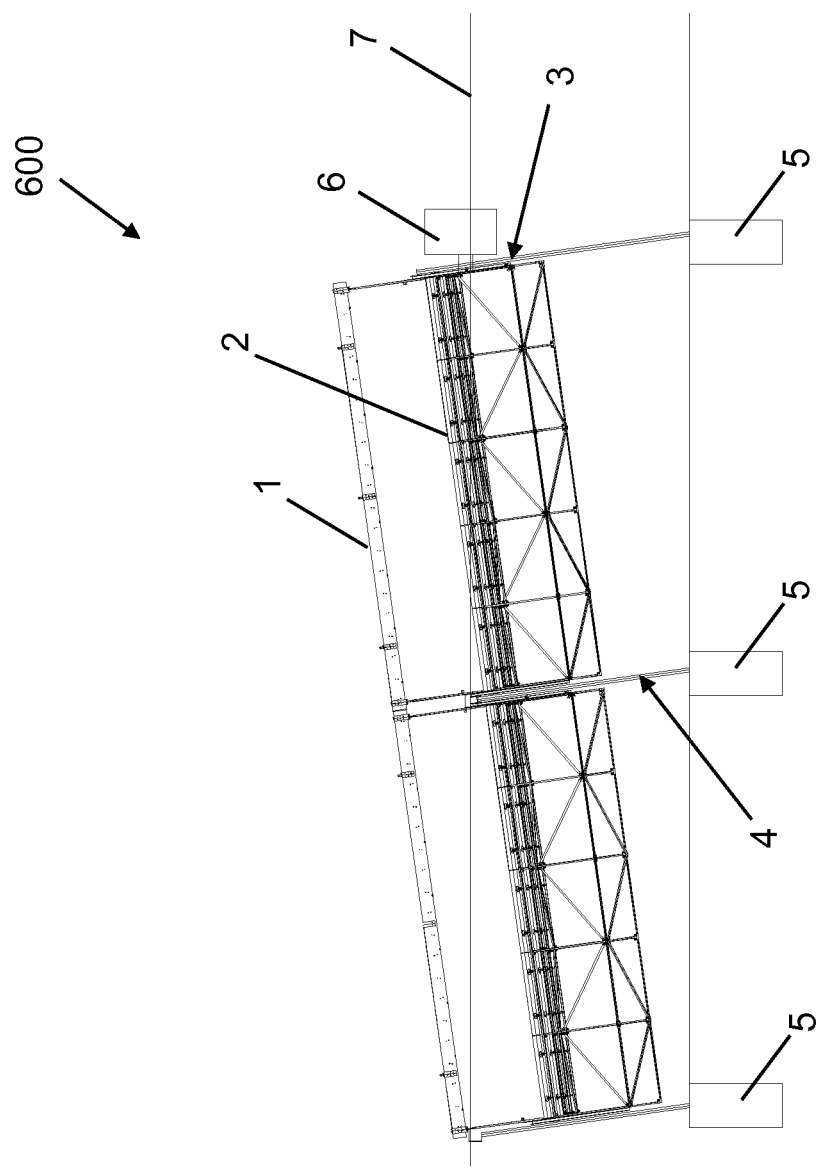
FIG. 7 is a back view of the solar energy collection system shown in FIGS. 6A and 6B when the solar energy collection system is in a tilted position.

FIG. 7 shows that for the trough collector (including the CPC 1 and the primary collector 2) can be tilted at different angles about a rotating axis 7 to track the sun. In the example shown in FIG. 7, the rotating axis 7 is horizontal and is not coplanar to the primary reflector 2. The tilt angle is 8 degree. When the rotation axis 7 is orientated in the North South direction, the solar collection system 600 can collect more energy during winter months.

Figure 26:
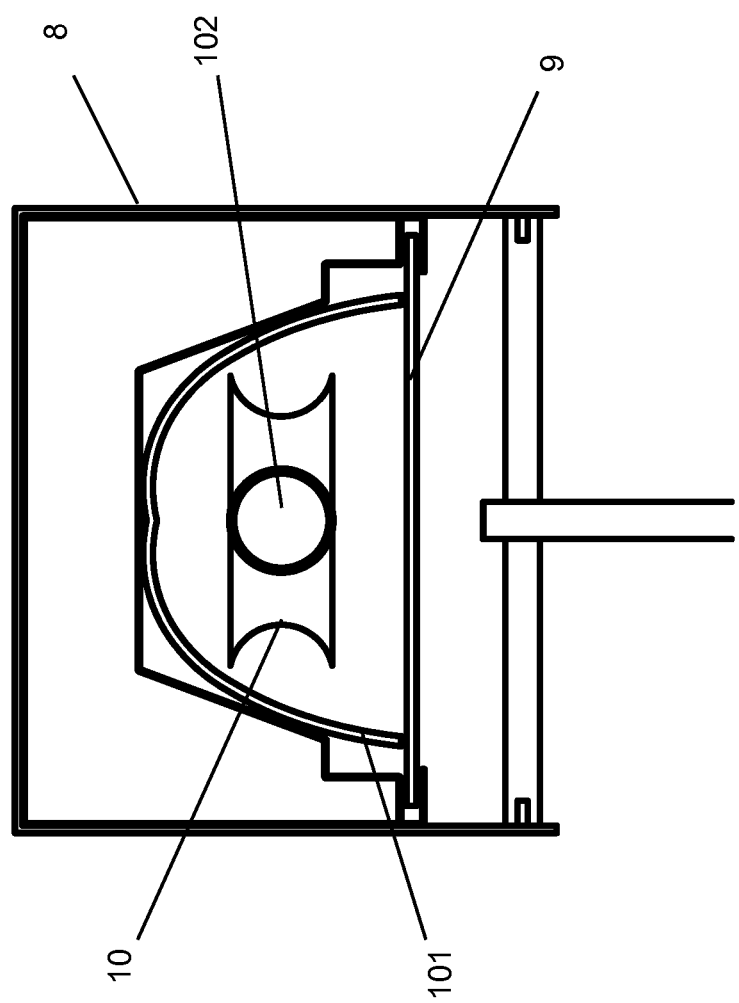
FIG. 26 illustrates detailed structure of the receiver tube and secondary reflector in the disclosed solar energy collection system.

The solar collection system 600 includes a number of advantageous features. The CPC 1, as shown in FIGS. 8 and 26, includes a large gap between the receiver tube 102 and the top of the secondary reflector 101, which can prevent the secondary reflector 101 from touching the hot receiver tube 102 during operation and prevent damages to the secondary reflector 101 that occur in some conventional systems.

Figure 8:
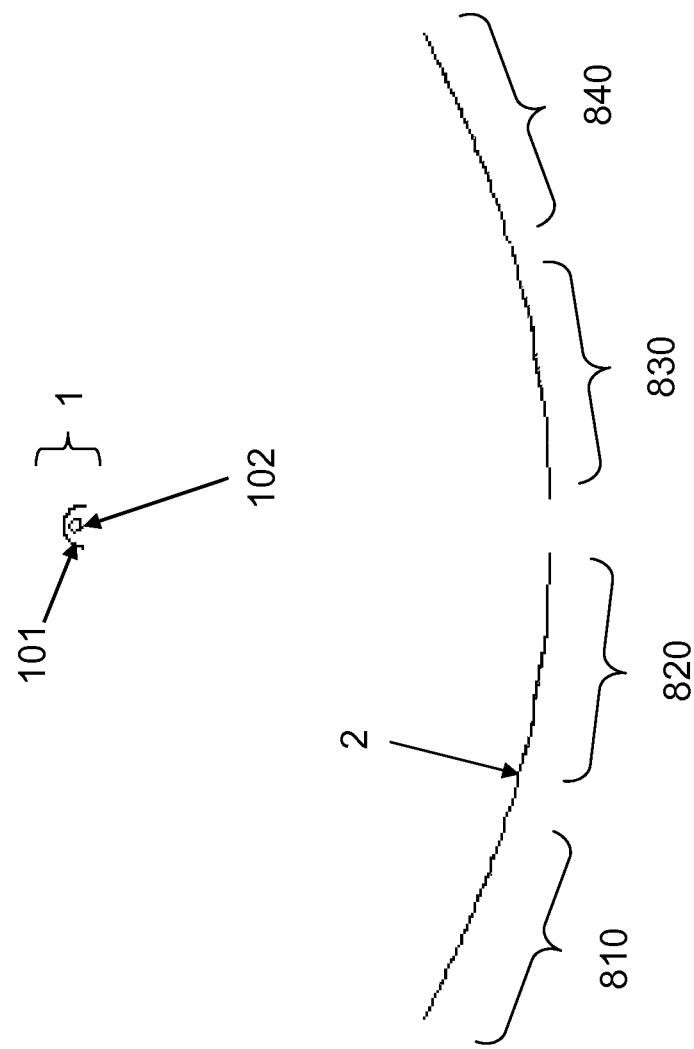
FIG. 8 is a side view showing the relative positions of the primary reflector and the CPC in the solar energy collection system shown in FIGS. 6A-7.
Figure 24:
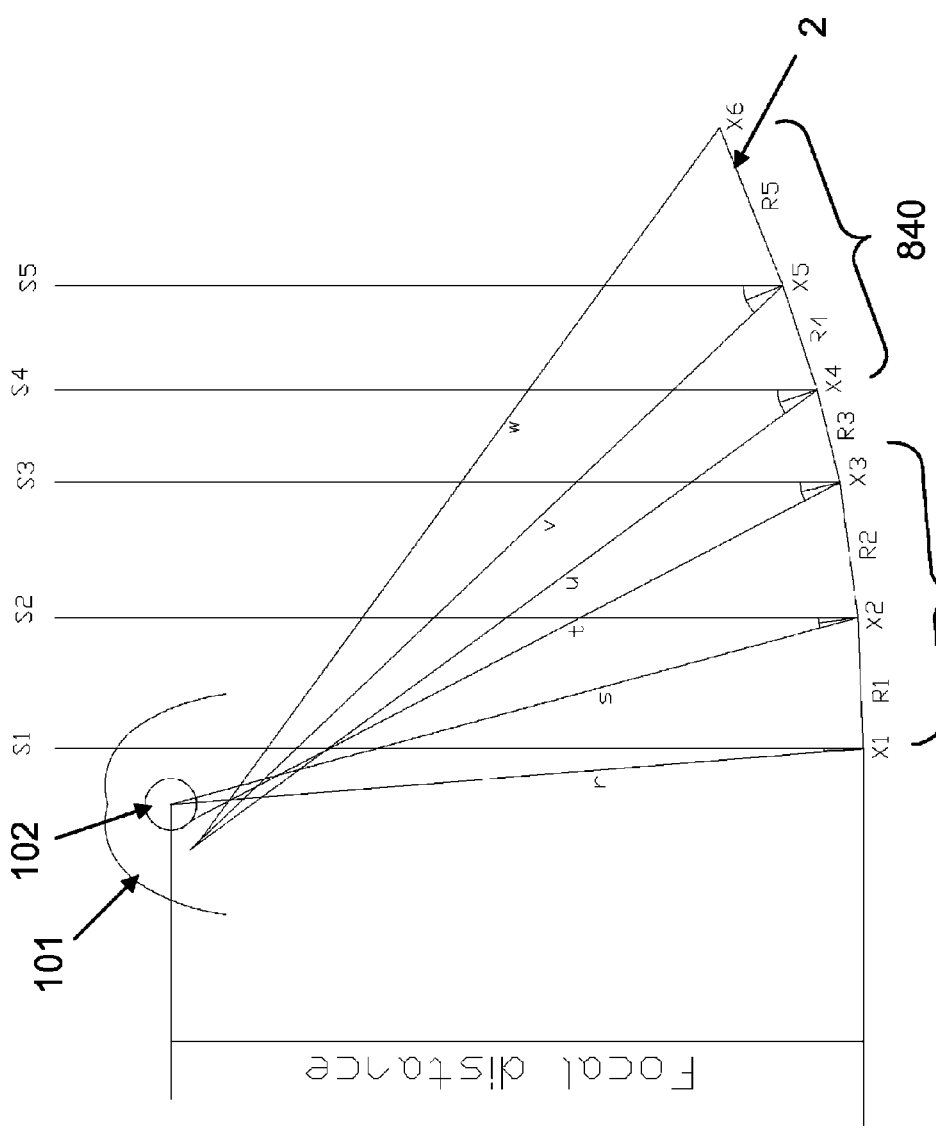
FIG. 24 illustrates the reflective zones on the right side of the primary reflector.

The primary reflector 2, shown in FIGS. 8 and 9, includes an upper left section 810, a middle left section 820, an upper right section 840, and a middle right section 830. The middle left section 820 separated by a distance equal to the orthographic projection width of the secondary reflector 101 on the primary reflector 2. The shape of the primary reflector 2 is slightly more concave than a parabola. The upper right section 840 of the primary reflector 2, as shown in FIG. 24, reflects the solar rays to the left part of the secondary reflector 101. These solar rays are then reflected to the left side of the receiver tube 102. Symmetrically, the upper left section 810 of the primary reflector 2 reflects the solar rays to the right part of the secondary reflector 101 (not shown in FIG. 24). These solar rays are then reflected to the right part of the receiver tube 102. The middle left section 820 and the middle right section 830 of the primary reflector 2 can reflect solar rays directly to the lower part of the receiver tube 102, or the upper part of the receiver tube 102 after being reflected by the secondary reflector 102.

Figure 10:
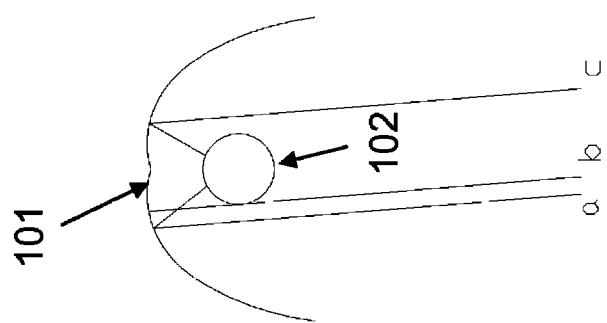
FIG. 10 is a schematic diagram showing a truncated linear "ice cream cone" shaped CPC.

FIGS. 10-25 show detailed design principles of the primary reflector 2. FIG. 10 shows a truncated linear "ice cream cone" shaped secondary reflector 101 with a half acceptance angle of 50 degree, a steel receiver tube 102 coated with a selective solar absorbing layer, and parallel solar rays a, b and c being reflected by the secondary reflector 101. A gap between the secondary reflector 101 and the receiver tube 102 can prevent thermal shock to the secondary reflector 101. Rays a and c are reflected by the secondary reflector 101 to the upper part of the receiver tube 102, where their energies are absorbed. A part of the secondary reflector 101 is an involute which means that any ray (like ray b) having an incidence angle less than the acceptance angle and tangential to the receiver tube 102 is reflected tangentially back by the secondary reflector 101 still tangential to the receiver tube 102.

Figure 12:
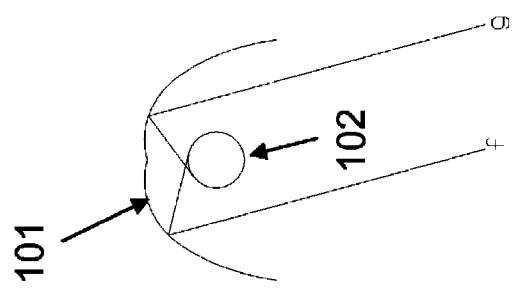
FIGS. 11-23 illustrate optical paths of the solar rays reflected by the secondary reflector toward the receiver tube.
Figure 11:
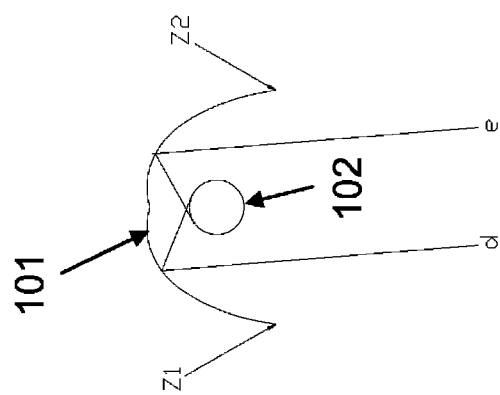

FIG. 11 shows edge rays d and e. FIG. 12 shows edge rays f and g at different incident angles. Edge rays define the edges of a zone in which all solar rays with the same incidence angle as the edge rays can directly strike the receiver tube 102 or hit the receiver tube 102 after a single reflection. Z1 and Z2 refer to the edges of the secondary reflector 101. An edge ray is defined as a solar ray that 1. strikes the receiver tube 102 tangentially, or
2. strikes the receiver tube 102 tangentially after one reflection on the CPC, or
3. passes by Z1 or Z2 and hits the receiver tube 102 directly, or
4. passes by Z1 or Z2 and hits the receiver tube 102 after one reflection by the secondary reflector 101.

Solar rays outside of the region between the edge rays d, e (or f, g) and having the same direction as edge rays d, e (or f, g) cannot hit the receiver tube 102 directly or after a single reflection by the second reflector 101. Such solar rays will pass between the receiver tube 102 and the second reflector 101 and will be lost.

Figure 13:
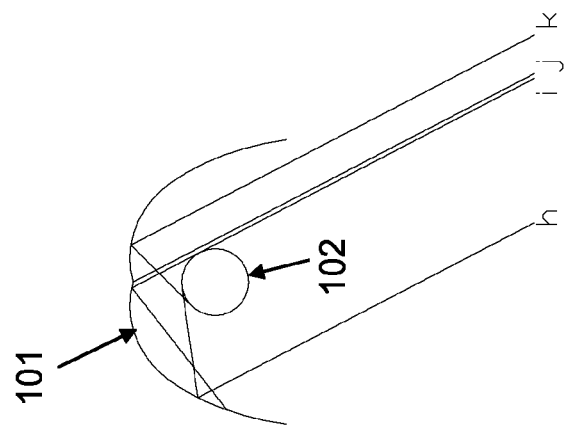
Figure 18:
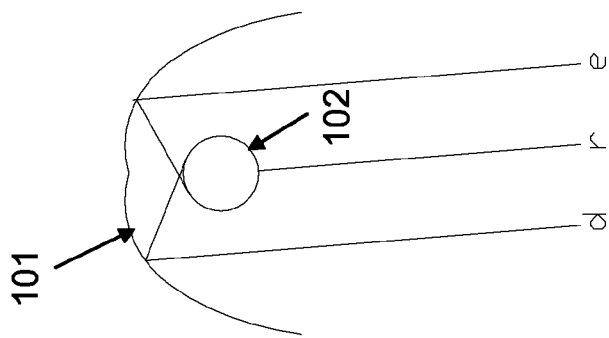

FIG. 13 shows that at a certain incidence angle solar rays between j and k are reflected in a wrong direction to the left side of the second reflector 101, which are not collected by the receiver tube 102. Solar rays between j and k will be lost. The above described losses are related to the optical gap between the secondary reflector 101 and the receive tube 102. Conventional systems attempt to avoid these losses by positioning the secondary reflector in contact with the receiver to close the optical trap.

Figure 14:
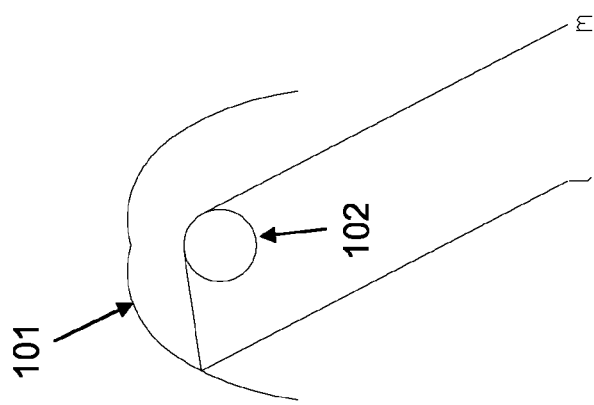

The presently disclosed system adopts a new design to eliminate optical gap losses by forming new edge rays 1, m in FIG. 14 (or edge rays h, i in FIG. 13). To prevent gap losses, the shape and the relative positions of the primary reflector 2, the secondary reflector, and the receiver tube 102 are designed such that solar rays from the primary reflector 2 are reflected to the middle of each zone formed by edge rays. This design assures that solar rays from the primary reflector 2 can always either directly hit the receiver tube 102 or hit the receiver tube 102 after a single reflection by the second reflector 101.

Figure 15:
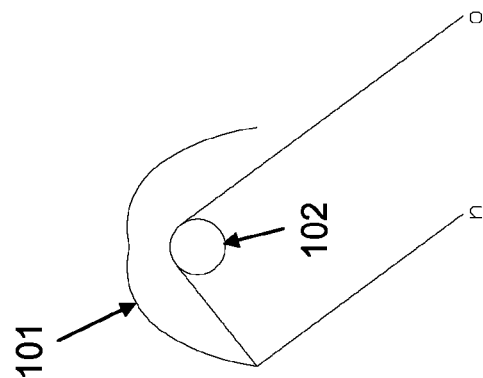
Figure 17:
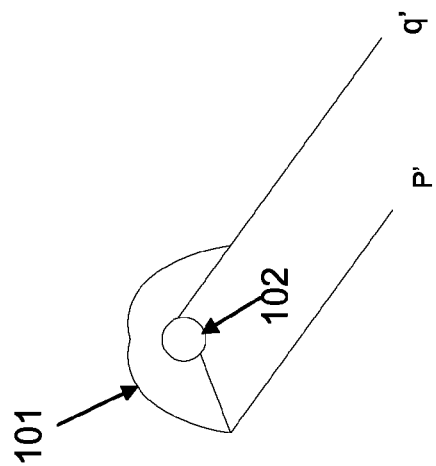
Figure 16:
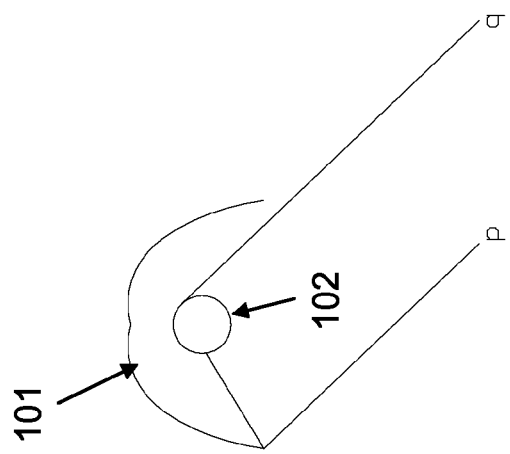
Figure 21:
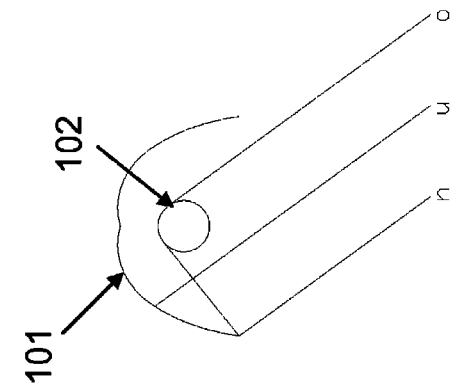
Figure 20:
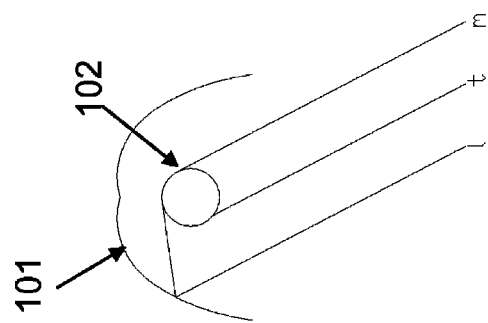
Figure 19:
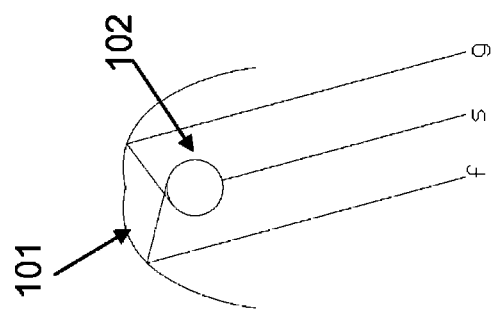
Figure 23:
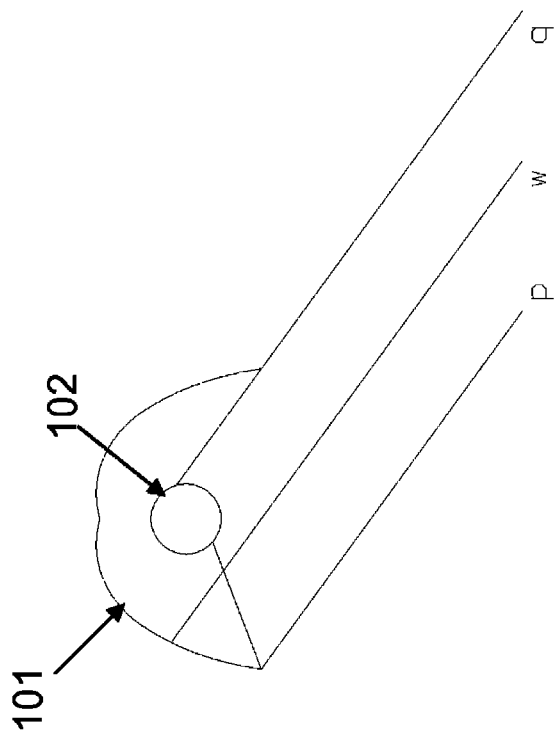
Figure 22:
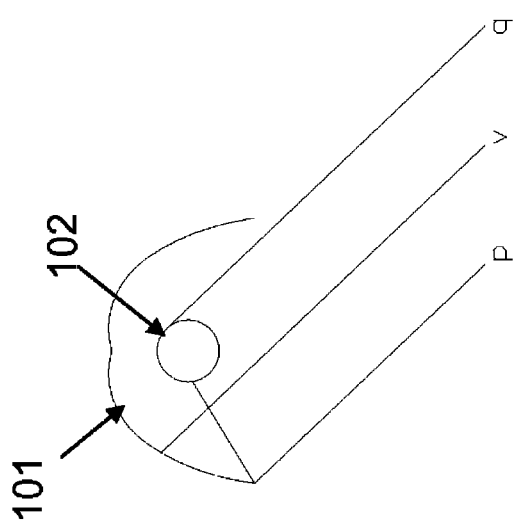

FIG. 15 shows a ray n passing by the edge of the second reflector 101. At this incident angle, any solar rays striking the secondary reflector can be reflected to the receiver tube 102. As higher incidence angles as shown in FIGS. 16 and 17, edge rays p, p' and q' are not longer reflected tangentially to the receiver tube 102.

FIGS. 18-23 show that the solar rays (i.e. middle rays r, s, t, w, v and u) that propagate in the middle of zone formed by the two edge rays. Each middle ray r, s, t, w, v and u can either directly hit the receiver tube 102 or hit the receiver tube after one reflection. Reflection paths of these middle rays r, s, t, w, v and u lead them toward the receiver tube 102 and will not suffer gap losses. As a result, the disclosed system can achieve higher solar collection efficiencies.

FIG. 24 illustrates the shape design of the primary reflector 2 using middle rays r, s, t, u, v. A first point X1 on the primary reflector 2 is determined at the intersection a desired focal distance and the first middle ray r. At this point X1, the incoming solar radiation S1 is required to be reflected as to ray r. This condition defines the slope of a segment R1 in the primary reflector 2. The intersection of the segment R1 and ray s determines a second point X2 on the primary reflector 2. The incident solar ray S2 and the reflected solar ray s can determine the slope of the segment R2.

Figure 25:
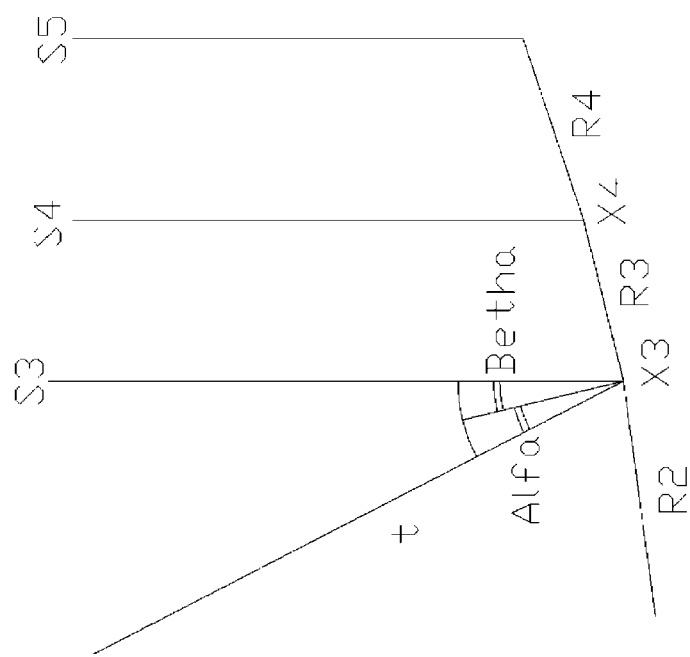
FIG. 25 illustrates detailed geometries of the solar rays reflected by the primary reflector in FIG. 24.

Similarly, as shown in FIG. 25, an incoming solar ray S3 is reflected to form ray t. The intersection of R2 and S3 determines point X3 on the primary reflector 2. As the reflected angle Alfa is equal to the incidence angle Betha, the slope of the segment R3 in the primary reflector 2 can be determined. The intersection of the segment R3 with S4 will give a next point X4 on the primary reflector. The above described steps can be repeated using a large number of calculated middle rays to produce a complete shape profile for the primary reflector 2.

As shown in FIG. 24, the segments R1, R2, and R3 form the middle right section 830 of the primary reflector 2, from which solar rays are reflected to a focal line or a quasi focal line at or near the axis of the receiver tube 102. In the present application, for the simplicity of description, the term "focal line" is used to cover both "a focal line" and "a quasi focal line". The segments R3, R4, R5 form the upper right section 840 of the primary reflector 2, which can reflect solar rays to a quasi focal line on the left side of the receiver tube 102. Equally and out of symmetry, upper left section 810 in the primary reflector 2 can reflect solar rays to a quasi focal line on the right side of the receiver tube 102.

An advantage of the quasi focal lines on the two sides of the receiver tube 102 is that they allow the secondary reflector 101 to be easily adjusted. The positional accuracies of the quasi focal lines (and thus the alignment of the secondary reflector 102) can be verified by placing a calibration screen put at the entrance of the secondary reflector 102.

The middle left section 820 and the middle right section 830 of the primary reflector 2 can define reflective surfaces of substantially the shape of a parabola. The primary reflector 2 is slightly more concave than the parabola defined by the middle left section 820 and the middle right section 830. The upper left section 810 and the upper right section 840 of the primary reflector 2 need to be tilted slightly inwards, which help to move their respective focal lines to the two sides of the receiver tube 102. Although the solar reflections by the transitional section R3 may lose some performance because R3 does not convert exactly to the focal line or a quasi focal line on the receiver tube 102. Another advantage of the described procedure is that it allows east installation using existing equipment or commercially available components.

FIG. 26 shows the structure of the receiver tube 102 and the secondary reflector 101. The back of secondary reflector 101 can be insulated by a steel casing 8 against heat and precipitation. The steel casing 8 can also provide a stable structure to support all components inside. A radiation shield can be placed around the steel sheet to protect the steel casing 8 from concentrated radiation. The secondary reflector 102 defines a cavity. The entrance of the cavity facing the primary reflector 2 can be sealed by a sheet 9 to reduce heat loss. The sheet 9 can be made of a glass material or a polymeric material (e.g. TEFLON™). The glass material can be a hardened glass or a borosilicate glass, which can sustain large temperature variations and thermal shocks. An anti-reflective layer can be coated on the glass sheet to reduce reflective thermal losses and to repel dusts. The coated layers should have a low refractive index. One suitable material for the coated layer is porous silica. Furthermore, a second sheet can be placed in parallel to the first sheet to further reduce the heat losses.

The receiver tube 102 or its glass envelop can expand at elevated temperatures. In the disclosed solar collection system 600, the receiver tube 102 can be supported by two guiding wheels 10 on bearings, which allow easy movement and reduce thermal stress in the receiver tube 102. The receiver tube 102 is coated with a spectrally selective layer to have high solar absorption but a low thermal emission. The reflective coating can include a silver layer and a protective outer layer comprising silica or alumina.

Figure 27:
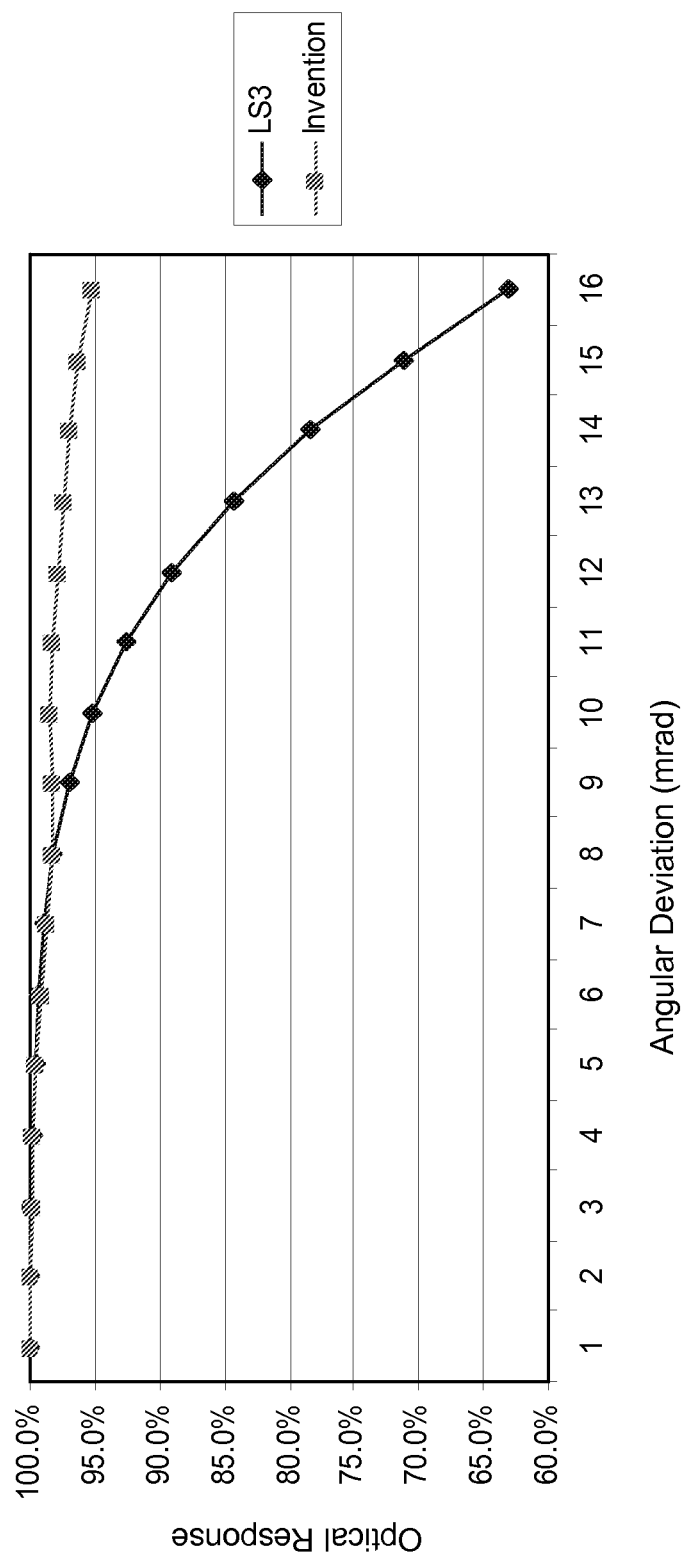
FIG. 27 is a graph showing optical responses of the disclosed solar energy collection system and a conventional solar collection system.

FIG. 27 shows the optical response of the invention compared to a conventional solar collection system LS3. In this analysis, the disclosed solar collection system demonstrated a 60% increase in optical response over the conventional solar collection system LS3 (made by LUZ System 3 located at Harper Lake, Calif.). It is also observed that the disclosed solar collection system had a 15% increase in the solar concentration ratio comparing to the conventional solar collection system LS3.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

It should be noted that the disclosed systems and methods are compatible with different fabrication techniques and processes, as well as structural configurations without deviating from the spirit of the present invention. For example, the receiver can have the shape other than cylindrical and made of different materials as described from the above examples. The primary reflector and the secondary reflector can be made of different materials. The support structure, the means of insulation, and the rotation mechanism can be provided differently while still being compatible with the present invention.

What is claimed is:

1. A solar collection system comprising:
a receiver, wherein the receiver has the shape of a tube;
a primary reflector comprising a first reflective section, a second reflective section on the left side of the first reflective section, a second reflective section on the left side of the first reflective section, and a third reflective section on the right side of the first reflective section, wherein the first reflective section of the primary reflector is configured to reflect solar rays to a first focal line on the receiver positioned at or near the axis of the tube, wherein the second reflective section of the primary reflector is configured to reflect solar rays to a second focal line on the right side of the receiver, wherein the third reflective section is configured to reflect solar rays to a third focal line on the left side of secondary receiver; and
a secondary reflector configured to reflect the solar rays reflected by the second reflective section and the third reflective section of the primary reflector to the receiver.

2. The solar collection system of claim 1, wherein the receiver is supported by guiding wheels.

3. The solar collection system of claim 1, wherein the receiver comprises a steel tube having a spectral selective coating.

4. The solar collection system of claim 3, wherein the receiver comprises one or more layers glass envelop around the steel tube.

5. The solar collection system of claim 1, wherein the secondary reflector is not in contact with the receiver.

6. The solar collection system of claim 1, wherein the solar rays reflected by the second reflective section to the secondary reflector are in the middle of a zone formed by edge rays, wherein the edge rays are defined by the solar rays that either pass by an edge of the secondary reflector, or strike a spot on the receiver directly or after a reflection wherein the edge rays are tangential to the spot on the receiver.

7. The solar collection system of claim 6, wherein the edge rays comprise a first edge ray and a second edge ray, wherein the zone comprises one of the following zone types:
- zone 1: the first edge ray strikes a spot on the receiver, wherein the first edge ray is tangential to the spot on the receiver, and the second edge ray strikes the receiver tangentially after being reflected by the right edge portion of the secondary reflector;
- zone 2: the first edge ray strikes the receiver, wherein the first edge ray is tangential to the spot on the receiver, and the second edge ray strikes the receiver tangentially after being reflected by the left edge portion of the secondary reflector;
- zone 3: the first edge ray strikes the receiver, wherein the first edge ray is tangential to the spot on the receiver, and the second edge ray strikes the receiver after being reflected by the right edge portion of the secondary reflector; and
- zone 4: the first edge ray strikes the receiver by the left edge portion of the secondary reflector and the second edge ray strikes the receiver after being reflected by the right edge portion of the secondary reflector.

8. The solar collection system of claim 1, wherein the primary reflector comprises a glass material coated with a layer of silver.

9. The solar collection system of claim 1, wherein the first reflective section of the primary reflector comprises a left part and a right part that are separated by a distance equal to the orthographic projection width of the receiver on the primary reflector.

10. The solar collection system of claim 1, wherein the secondary reflector defines a cavity, wherein an opening of the cavity facing the primary reflector is sealed by a sheet to reduce heat loss.

11. The solar collection system of claim 10, wherein the sheet comprises a glass material or TEFLON™.

12. The solar collection system of claim 1, further comprising a mechanism configured to rotate the primary reflector about a rotating axis, wherein the rotating axis is not coplanar to the primary reflector.

* * * * *